(12) United States Patent  
Chen et al.

(10) Patent No.: US 8,315,764 B2
(45) Date of Patent: Nov. 20, 2012

(54) OPTIMAL CORNER CONTROL FOR VEHICLES

(75) Inventors: Shih-Ken Chen, Troy, MI (US); Youssef A. Ghoneim, Rochester, MI (US); Weiwen Deng, Rochester Hills, MI (US); Nikolai K. Moshchuk, Grosse Pointe, MI (US); Bakhtiar Brian Litkouhi, Washington, MI (US); Valery Pylypchuk, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 12/876,417

(22) Filed: Sep. 7, 2010

(65) Prior Publication Data

US 2012/0059547 A1 Mar. 8, 2012

(51) Int. Cl.
*B60W 10/00* (2006.01)
(52) U.S. Cl. .................. 701/37; 701/41; 701/48; 701/70
(58) Field of Classification Search .................. 701/37, 701/41, 48, 70, 71, 72, 73, 74, 75, 78–82; 180/197, 282; 303/139, 140
See application file for complete search history.

(56) References Cited

U.S. PATENT DOCUMENTS

| 7,274,981 | B2* | 9/2007 | Eriksson | 701/37 |
|---|---|---|---|---|
| 7,308,352 | B2* | 12/2007 | Wang et al. | 701/70 |
| 7,427,849 | B2 | 9/2008 | Kaneko et al. | |
| 7,472,006 | B2 | 12/2008 | Turski et al. | |
| 7,957,876 | B2* | 6/2011 | Shiiba et al. | 701/70 |
| 8,024,091 | B2* | 9/2011 | Takenaka et al. | 701/48 |
| 2006/0155451 | A1 | 7/2006 | Kuwahara et al. | |
| 2007/0004553 | A1 | 1/2007 | Oikawa et al. | |
| 2007/0021875 | A1 | 1/2007 | Naik et al. | |
| 2008/0066976 | A1 | 3/2008 | Yamada | |
| 2008/0140283 | A1 | 6/2008 | Kuwahara et al. | |

OTHER PUBLICATIONS

U.S. Appl. No. 12/845,127, Chen et al.
Hamada et al., "Development of Vehicle Dynamics Integrated Management", SAE Paper No. 2006-01-0922.
Brach et al., "Modeling Combined Braking and Steering Tire Forces", SAE Paper No. 2000-01-0357.
Nicolas et al., "Predicting Directional Behavior of Tractor Semitrailers When Wheel Anti-Skid Brake Systems Are Used", Paper No. 72-WA/Aut-16, ASME Winter Annual Meeting, Nov. 26-30.
Pottinger et al., "Effectiveness of the Slip Circle, 'Combinator', Model for Combined Tire Cornering and Braking Forces When Applied to a Range of Tires", SAE Paper 982747, Warrendale, PA 15096.
Svendenius, J., "PhD Thesis: Tire Modeling and Friction Estimation, Department of Automatic Control", Lund University, Lund, Apr. 2007.
He et al., "Experimental Evaluation of Dynamic Force Distribution Method for EV Motion Control", IEEE Ref. No. 1-4244-0844-X/07, pp. 682-687, 2007.
Knobel et al., "Optimized Force Allocation, A General Approach to Control and to Investigate the Motion of Over-Actuated Vehicles", BMW Group Research and Technology, 80788 Munich, Germany, pp. 366-371.

* cited by examiner

*Primary Examiner* — Richard M. Camby

(57) ABSTRACT

A method to control a vehicle having a plurality of wheels includes monitoring desired vehicle dynamics, determining a desired corner force and moment distribution based upon the desired vehicle dynamics and a real-time closed form dynamics optimization solution, and controlling the vehicle based upon the desired corner force and moment distribution. The real-time closed form dynamics optimization solution is based upon a minimized center of gravity force error component, a minimized control energy component, and a maximized tire force reserve component.

17 Claims, 4 Drawing Sheets

US 8,315,764 B2

OPTIMAL CORNER CONTROL FOR VEHICLES

TECHNICAL FIELD

This disclosure is related to vehicle control.

BACKGROUND

The statements in this section merely provide background information related to the present disclosure and may not constitute prior art.

Vehicle control describes methodologies wherein operation of a vehicle or of a system within a vehicle is monitored and computerized control is applied to modify the operation of the vehicle. Exemplary vehicle control strategies monitor vehicle dynamics or the current or expected forces and moments acting upon the vehicle and apply control methods based upon the forces and moments to maintain desired operation of the vehicle. For example, when a vehicle is stopping quickly, forces and moments can cause the body of the vehicle to rotate forward, compressing the front suspension. Vehicle control can counter such monitored or anticipated rotation of the body of the vehicle by energizing actuators located at the front corners of the vehicle to lift up on the vehicle body and stop the front suspension from compressing. In another example, in a braking maneuver, forces and moments acting upon the vehicle and braking forces being applied to the wheels can be used to monitor or predict slippage between a wheel and the road. Actuators at the brakes of the vehicle can be used to redistribute braking force among the wheels to avoid slippage. In another example, in a turning maneuver, forces and moments acting upon the vehicle and a steering angle can be used to monitor or predict an over-steer or an under-steer condition, and an actuator acting upon the steering system can correct the steering. In another example, forces acting upon the vehicle and a current torque being applied to the drivetrain and the wheels can be used to monitor or predict slippage between the wheels and the road, and an actuator can be used to modify the torque being transmitted to the wheels through various methods known in the art.

A number of systems can be monitored and/or affected through vehicle control. Examples include braking, steering, driveline performance or powertrian torque output, and suspension control. According to an exemplary method, driver commands and/or autonomous driving system commands are integrated to determine desired vehicle dynamic or kinematic states, a vehicle dynamics module inputs the desired vehicle dynamic or kinematic states and outputs a desired vehicle force and/or moment, and an actuator supervisory control module generates commands in one or more vehicle systems to affect the desired vehicle force and or moment. Integration of the commands can include feedback regarding current or resultant vehicle dynamic or kinematic states, and the actuator supervisory control module can include feedback of current or resultant actuator states.

SUMMARY

A method to control a vehicle having a plurality of wheels includes monitoring desired vehicle dynamics, determining a desired corner force and moment distribution based upon the desired vehicle dynamics and a real-time closed form dynamics optimization solution, and controlling the vehicle based upon the desired corner force and moment distribution. The real-time closed form dynamics optimization solution is based upon a minimized center of gravity force error component, a minimized control energy component, and a maximized tire force reserve component.

BRIEF DESCRIPTION OF THE DRAWINGS

One or more embodiments will now be described, by way of example, with reference to the accompanying drawings, in which.

DETAILED DESCRIPTION

Figure 1:
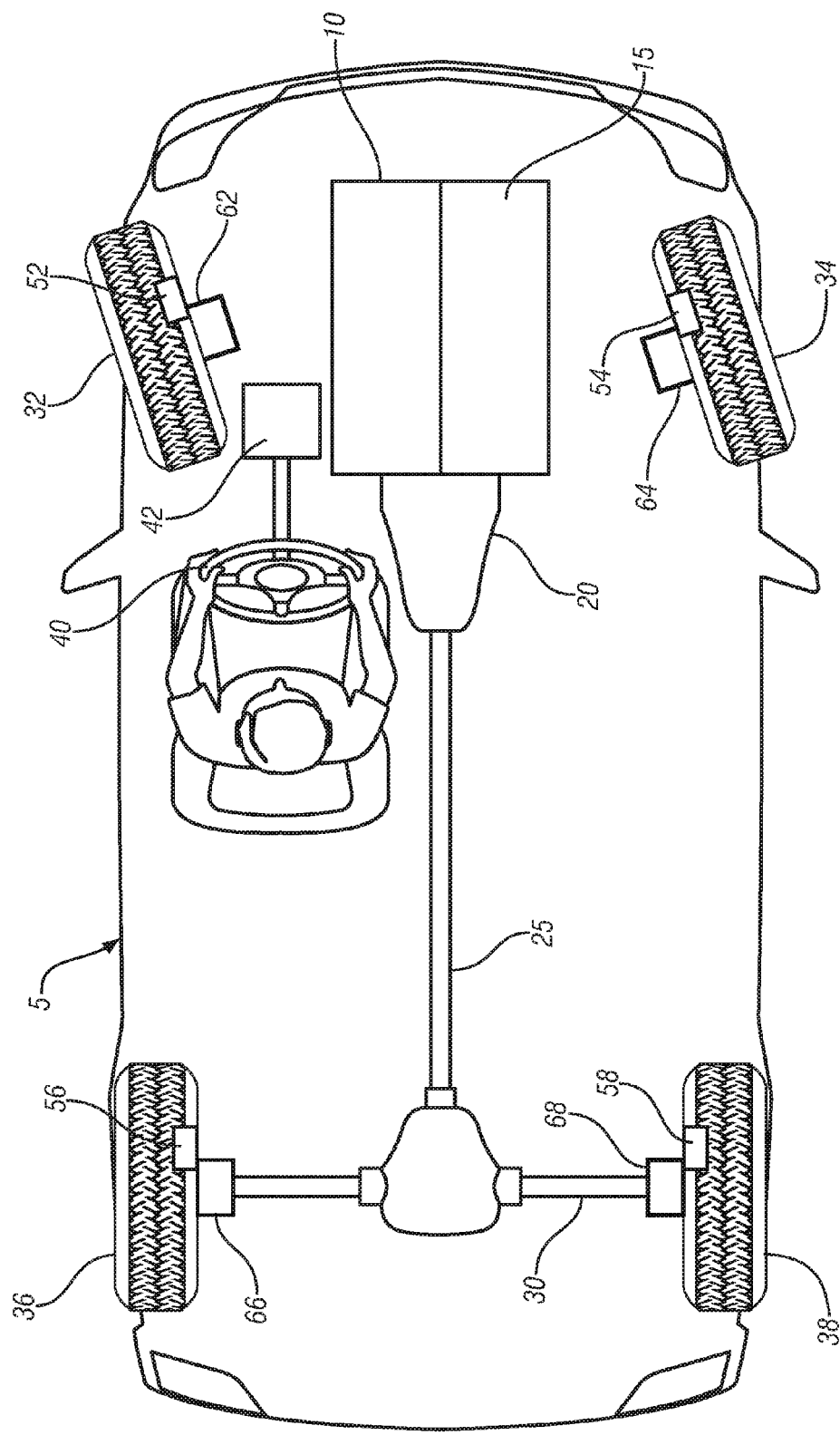
FIG. 1 schematically depicts an exemplary vehicle including systems affected by vehicle control, in accordance with the present disclosure.

Referring now to the drawings, wherein the showings are for the purpose of illustrating certain exemplary embodiments only and not for the purpose of limiting the same, FIG. 1 schematically depicts an exemplary vehicle including systems affected by vehicle control, in accordance with the present disclosure. Vehicle 5 includes engine 10, electric motor 15, transmission 20, driveline 25 including rear axle 30, and wheels 32, 34, 36 and 38. Engine 10 and electric motor 15 can each provide torque that can be used to propel the vehicle 5 through driveline 25. Transmission 20 includes clutching devices capable of selectively connecting each of the torque generative devices, engine 10 and electric motor 15 to the driveline 25. Transmission 20 is used to selectively shift the vehicle through a number of gear states including a neutral gear state and a reverse gear state. Additionally, torque through the transmission can be utilized to run electric motor 15 in a generation mode, charging an associated energy storage device, or torque can be transferred between the torque generative devices, for example, with electric motor 15 being utilized to start engine 10. The exemplary configuration of FIG. 1 describes one possible powertrain that can be utilized for a vehicle. A number of exemplary embodiments can equally be utilized. For example, a plurality of at-wheel motors can be utilized in place of the depicted engine 10 and motor 15. In one such embodiment, four at-wheel motors can individually provide torque to each of the wheels. The disclosure is not intended to be limited to the particular powertrain embodiments described herein. A steering wheel 40 and a steering system 42 are capable of turning wheels of the vehicle through methods known in the art. FIG. 1 depicts wheels 32 and 34 turning. It will be appreciated that a number of exemplary steering methods and wheel configurations are known, including four wheel steering, and the disclosure is not intended to be limited to the particular exemplary embodiments depicted herein. Wheels 32 and 34 are depicted turned in a manner consistent with the vehicle moving forward and turning to the left. At each of wheels 32, 34, 36 and 38, braking devices 52, 54, 56 and 58, respectively, are depicted. Each braking device is capable of applying a braking torque to the associated wheel. A number of different braking devices and control methods are known in the art, and can include exemplary hydraulic brakes, anti-lock brakes, and regenerative braking capable of charging an energy storage device. Additionally, at each of the wheels 32, 34, 36 and 38, suspension components 62, 64, 66, and 68, respectively, provide suspension for the body of the vehicle upon the wheels of the vehicle. Suspension components and methods are known in the art and provide both a dampened ride to passengers in the vehicle and also providing desired handling characteristics to the vehicle during operation.

As described above, methods are known to utilize actuators to modify the operation of various vehicle systems for purposes of vehicle control. For steering systems, actuators can take the form of electric power steering (EPS) which can control angle and torque of the steering system simultaneously to inputs from a driver or another semiautonomous or autonomous system. In another embodiment, actuators to control steering can be utilized through active front steering (AFS), a system that varies a ratio of steering wheel angle change to a change in steering angle of the front wheels. In such an embodiment, the AFS can act as an actuator, modulating the ratio based upon the inputs from a driver or another semiautonomous or autonomous system. In another example, active rear steering can be utilized as an actuator to control rear steering. For braking systems, electronic stability control systems (ESC) and antilock braking systems are systems that modulate braking actuation based upon inputs. Vehicle control inputs can be utilized to change the operation of the ESC or antilock braking systems to affect actuator control of braking. ESC, antilock braking systems, or other braking control systems can use hydraulic actuators with pumps and valves, self-pressurized systems, electric motors, or electric calipers to affect actuator control of braking. Actuators utilized to control a suspension system can utilize an active suspension system or roll control system, modifying this control based upon inputs from a driver or another semiautonomous or autonomous system. Actuators utilized to control an output of the powertrain can include torque control of the engine/motor and clutches or torque vectoring for the axles. Actuators controlling the described vehicle systems or sub-systems or other unnamed systems or sub-systems can take many forms, enabling control over the vehicle system or sub-system based upon an input from a driver or another semiautonomous or autonomous system. The disclosure is not intended to be limited to the particular exemplary embodiments described herein.

Certain methods to implement vehicle control may focus upon individual vehicle systems. For example, a steering control module can include a method to monitor vehicle dynamics and modify steering control based upon monitored or predicted forces and moments acting upon the vehicle. In the same vehicle, a suspension control module can include a method to monitor vehicle dynamics and modify suspension control based upon monitored or predicted forces and moments acting upon the vehicle. However, such uncoordinated vehicle control methods focusing on the subsystem and not on the integration of the subsystems to achieve a maximum available functionality of the vehicle can be ineffective, work against each other, or tend to operate only at near-limit or in nonlinear tire operating regions wherein stability of the vehicle is already diminished. For example, vehicle control based upon the specific vehicle systems may be feedback based, requiring that a sensor input indicate that the vehicle system has gone outside of a normal operating range before corrective control is applied. Further, it will be appreciated that integrating several independent control methods in a vehicle can include intensive and time consuming arbitration between the various control methods.

Commonly assigned U.S. Pat. No. 7,472,006 entitled "VEHICLE DYNAMICS CONTROL STRUCTURE" describes a method to implement vehicle control based upon coordinating individual vehicle systems and is hereby incorporated by reference.

Figure 2:
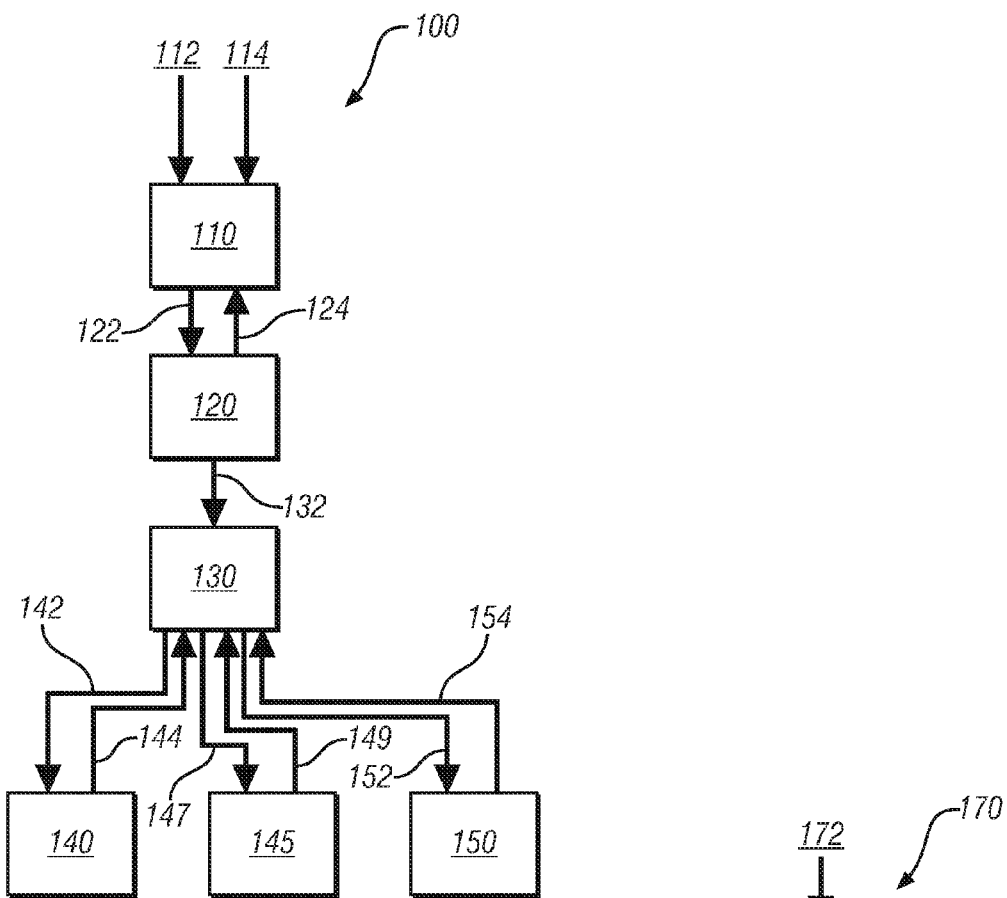
FIG. 2 schematically depicts a method to coordinate vehicle control for various vehicle systems, in accordance with the present disclosure.

FIG. 2 schematically depicts a method to coordinate vehicle control methods for various vehicle sub-systems, in accordance with the present disclosure. Vehicle dynamics or vehicle kinematics describe the operation of a vehicle upon a roadway. Desired vehicle dynamics or desired vehicle kinematics describes a desired operation of the vehicle in response to a control input, for example, a turn maneuver corresponding to a steering wheel angle or a slowing of the vehicle in response to a brake input. Method 100 includes command integration module 110 monitoring manual driving inputs 112 and/or sensor guided autonomous driving inputs 114 and generates desired vehicle dynamics/kinematics 122, describing vehicle operation desired by the driver or autonomous feature of the vehicle. Vehicle dynamics module 120 inputs desired vehicle dynamics/kinematics 122 and generates a desired vehicle force and moment 132, for example, forces and a moment acting upon the center of gravity of the vehicle, and resultant vehicle dynamics/kinematics 124. In the exemplary embodiment of FIG. 2, command integration module 110 additionally monitors resultant vehicle dynamics/kinematics 124 and can utilize this signal to provide feedback to the desired vehicle dynamics/kinematics 122 signal. Actuator supervisory control module 130 inputs desired vehicle force and moment 132 and generates control commands 142, 147 and 152 to respective actuator modules 140, 145 and 150 providing control commands to different systems within the vehicle, as described above. In one non-limiting example, actuator module 140 can include a module providing commands to a steering system, actuator module 145 can include a module providing commands to a suspension system, and module 150 can include a module providing commands to a braking system.

Method 100 provides for integrated control of various vehicle systems for vehicle control. Actuator supervisory control module 130 applies methods and programmed responses to the desired vehicle force and moment 132 to the various vehicle systems commanded by module 140, 145 and 150. However, these methods and programmed responses are feature-based responses, for example, a desired moment is identified, and a response including modification of a steering angle is generated. Such a response is still an isolated function for that vehicle system.

A corner dynamics control method is applied to a vehicle control method, determining a desired corner force and moment distribution for every wheel of the vehicle. By distributing a desired vehicle force and moment as a desired corner force and moment to each of the corners of the vehicle, a response of the various systems affecting a particular corner can be selectively generated based upon the desired force and moment for that corner. Such a method implements vehicle control as a net effect of all of the vehicle systems controlled rather than controlling the individual system piecemeal. Further, by distributing the desired force and moment to the four corner of the vehicle, real-time corner constraints or constraints describing an ability of each corner to contribute to vehicle control can be applied as part of the distribution, ensuring that the desired corner force and moment distribution is within a desired range for each corner and not in a near-limit condition. In this way, integration of various vehicle systems can be achieved based upon the vehicle response to the entirety of the systems being controlled. Further, by unifying control based upon desired forces and moments acting upon the vehicle, the control parameters can be standardized or customizable for vehicle configuration and driver preferences.

Figure 3:
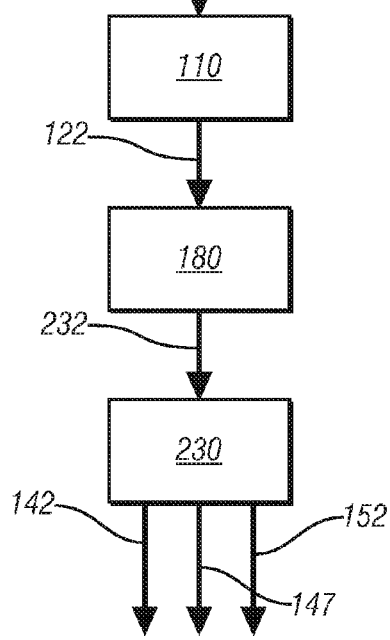
FIG. 3 schematically depicts an exemplary method to coordinate vehicle control by determining a desired corner force and moment distribution, in accordance with the present disclosure.

FIG. 3 schematically depicts an exemplary method to coordinate vehicle control methods by determining a desired corner force and moment distribution, in accordance with the present disclosure. Method 170 includes command integration module 110 monitoring vehicle command inputs 172 and generating desired vehicle dynamics/kinematics 122. A corner force distribution module 180 is depicted, inputting the desired vehicle dynamics/kinematics 122, applying methods described herein, and outputting a desired corner force and moment distribution 232. Actuator supervisory module 230 inputs the desired corner force and moment distribution 232 and outputs actuator commands 142, 147 and 152 to various vehicle systems to accomplish vehicle control.

Figure 4:
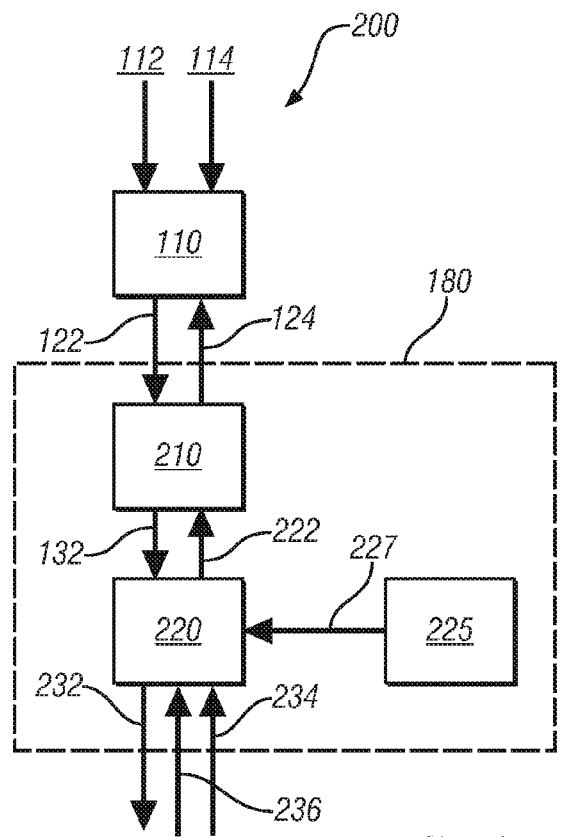
FIG. 4 schematically depicts an exemplary method to coordinate vehicle control by determining a desired corner force and moment distribution in more particular detail, in accordance with the present disclosure.

FIG. 4 schematically depicts an exemplary method to coordinate vehicle control by determining a desired corner force and moment distribution in more particular detail, in accordance with the present disclosure. Method 200 includes command integration module 110 monitoring manual driving inputs 112 and/or sensor guided autonomous driving inputs 114 and generates desired vehicle dynamics/kinematics 122, describing vehicle operation desired by the driver of the vehicle or a desired vehicle longitudinal, lateral forces and yaw moment. This vehicle operation desired by the driver, including manual and automatic inputs synthesized as desired vehicle dynamics/kinematics, can be described as an overall vehicle control command. According to one exemplary embodiment, command integration module 110 utilizes an inverse vehicle dynamics model. Additionally, command integration module 110 can monitor resultant vehicle dynamics/kinematics 124, as described above. Such resultant vehicle dynamics or kinematics can be developed by sensor or measurement systems, for example, monitoring a yaw rate, lateral acceleration, longitudinal acceleration, wheel speeds, estimated tire slip, estimated forces, and/or estimated friction between the wheels and the road surface. Corner force distribution module 180 is depicted, including a vehicle dynamics module 210, a corner dynamics control module 220, and a real-time constraints module 225. Vehicle dynamics module 210 inputs desired vehicle dynamics/kinematics 122 and generates desired vehicle force and moment 132 and resulting vehicle dynamics/kinematics 124. Corner dynamics control module 220 is depicted, monitoring desired vehicle force and moment 132. Corner dynamics control module 220 further monitors corner-based real-time constraints 227 from real-time constraints module 225. According to exemplary operation, module 220 minimizes a difference between desired and actual vehicle forces and moment, minimizes a control effort, and minimizes an occurrence of wheel instability such as excessive brake or traction slip. The optimization is constrained by the real-time constraints, for example, providing actuator limits, data regarding actuator anomalies, and energy management requirements. Exemplary corner-based real-time constraints 227 include a corner state of health and a corner capacity. Corner state of health or a corner capacity determination can include an ability or capacity of an actuator or actuators to produce the desired force at a particular corner. For example, a corner state of health can describe, in relation to an at-wheel motor, a lack of capability to achieve a desired corner force. If the actuator fails, it is not possible to apply the desired control action to this corner, and a corner state of health determination can describe the actuator as non-functional. A corner capacity determination can describe an ability of the actuator/actuators to achieve the corner force desired, for example, based upon an actuator approaching a heat limit and a resulting a limited control action. Corner dynamics control module 220 may further monitor a resultant tire slip/slip angle 234 and a resultant corner force and moment 236. Based upon monitored inputs, corner dynamics control module 220 generates desired corner force and moment distribution 232. Further, corner dynamics control module 220 can generate a resultant vehicle force and moment 222, which can be utilized as feedback by vehicle dynamics module 210. In this way, a desired vehicle force and moment can be utilized to develop a desired corner force and moment distribution for use in vehicle control.

Vehicle control can take a number of embodiments. As described in association with FIG. 2, vehicle control can include commands instructing a group of actuators controlling a vehicle sub-system or a group of vehicle sub-systems. Control of such actuators can implement a desired corner force and moment distribution as developed in FIG. 4. A number of sub-system control methods are known in the art, and the disclosure is not intended to be limited to the particular exemplary embodiments described herein.

Figure 5:
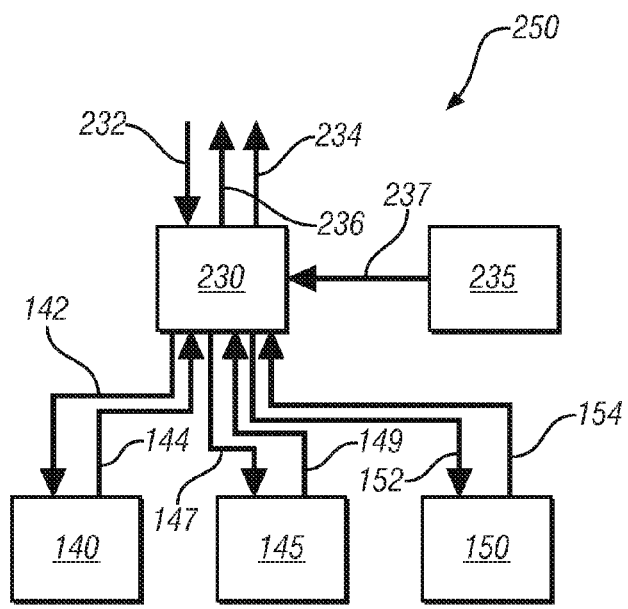
FIG. 5 schematically depicts a method to coordinate vehicle control for various vehicle systems utilizing a desired corner force and moment distribution, in accordance with the present disclosure.

FIG. 5 schematically depicts a method to coordinate vehicle control for various vehicle systems utilizing a desired corner force and moment distribution as depicted in FIG. 4, in accordance with the present disclosure. Method 250 includes an actuator supervisory control module 230 monitoring desired corner force and moment distribution 232 and generating control commands 142, 147 and 152 to respective actuator modules 140, 145 and 150 providing control commands to different sub-systems within the vehicle, as described above. Actuator supervisory control module 230 may further monitor additional real-time constraints 237 or real-time actuator-based constraints from real-time constraints module 235, for example, applying energy capacity and actuator limit information to the generation of control commands. Actuator supervisory control module 230 may further generate resultant tire slip/slip angle 234 and a resultant corner force and moment 236 for feedback to corner dynamics control module 220.

Figure 6:
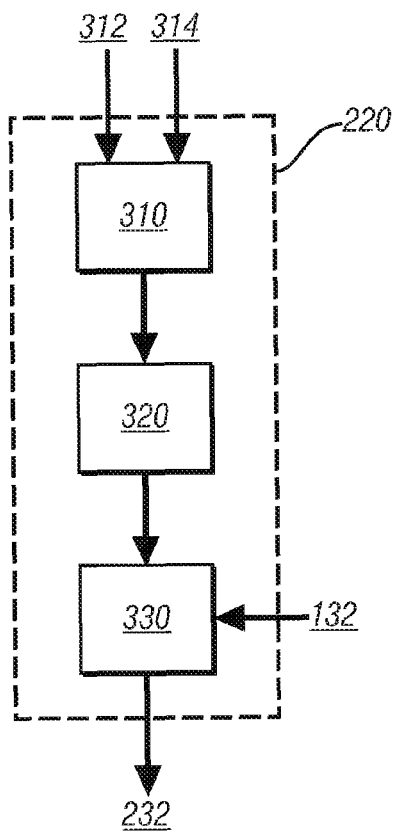
FIG. 6 schematically depicts exemplary operation of a corner dynamics control module in greater detail, in accordance with the present disclosure.

FIG. 6 schematically depicts exemplary operation of a corner dynamics control module in greater detail, in accordance with the present disclosure. Corner dynamics control module 220 is depicted, including corner capacity assessment module 310, system constraints integration module 320, and corner force distribution module 330. Corner capacity assessment module 310 monitors corner-based real-time constraints, in this exemplary embodiment, including corner state of health 312 and corner capacity 314. Corner state of health 312 and corner capacity 314 used as inputs can be used to describe how much force and moment a particular corner can desirably handle in current conditions. System constraints integration module 320 monitors the assessment of corner capacity from module 310 and determines how individual corners, as constrained or limited, can contribute to vehicle control. Module 320 outputs the constrained corner parameters to the corner force distribution module 330. Corner force distribution module 330 inputs the output of module 320 and desired vehicle force and moment 132 and distributes the force and moment to the various wheels as desired corner force and moment distribution 232.

Figure 7:
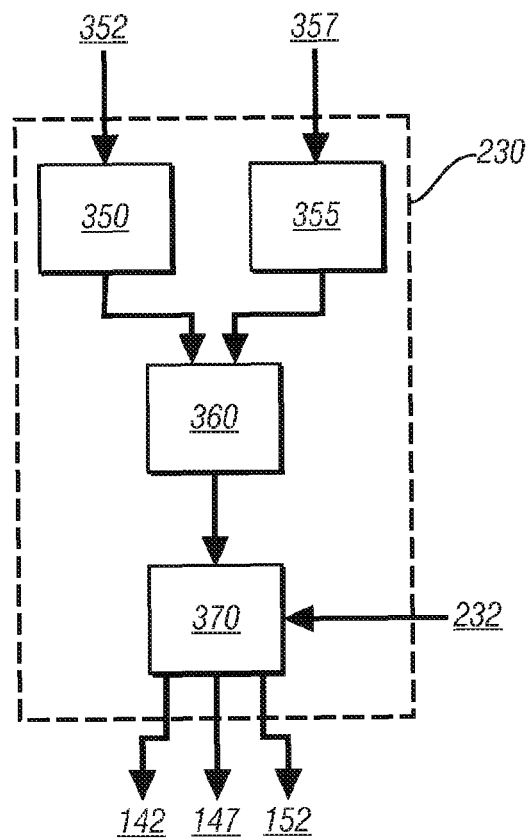
FIG. 7 schematically depicts exemplary operation of an actuator supervisor control module in greater detail, in accordance with the present disclosure.

FIG. 7 schematically depicts exemplary operation of an actuator supervisor control module in greater detail, in accordance with the present disclosure. Actuator supervisory control module 230 is depicted, including energy capacity assessment module 350, actuators assessment module 355, system constraints integration module 360, and optimized actuator control allocation module 370. Energy capacity assessment module 350 monitors real-time constraints, in this exemplary embodiment, including energy capacity information 352 regarding a desired power needed from a power supply, for example, from an internal combustion engine, fuel cell, or battery, considering the desired tractive forces. By monitoring energy capacity information 352, a selection of a power source and application of that source can be made based upon power availability in real-time. Actuators assessment module 355 monitors real-time constraints, in this exemplary embodiment, including actuator limits/states of health 357. Actuator limits or states of health can include, for example, a reduction of actuator capacity due to variation of temperature or due to a particular vehicle state. Energy capacity information 352 and actuators limits/states of health 357 as inputs can be used to describe how much force and moment a particular corner can desirably handle in current conditions. System constraints integration module 360 utilizes inputs to determine how individual actuators can contribute to the corner control and outputs parameters describing corner actuator limits (maximum torque, actuator bandwidth, etc.) to the optimized actuator control module 370. Optimized actuator control allocation module 370 inputs the output of module 360 and desired corner force and moment distribution 232 and generates control commands to relevant actuators, in this example, commands 142, 147 and 152.

Actuator anomalies can reduce the ability of a vehicle control system to react to vehicle operation. For example, if an actuator is non-functional or does not react to commands generated by the vehicle control system, benefits from the vehicle control system can be negated or adverse effects to drivability can be apparent. Based upon a system utilizing a corner dynamics control module as described herein monitoring actuator function and determining an actuator to be non-functional, distribution of force and moment to the various corners can be adjusted to compensate for the known actuator anomaly.

The above methods describe methods of vehicle control that can be used to control vehicle systems. Vehicle systems can take many embodiments. For example, a powertrain is depicted in FIG. 1 including an engine and an electric motor. A number of different embodiments of a powertrain can be utilized. For example, a powertrain can include a single torque generative device, for example, including a motor or engine or two torque generative devices, such as two motors or a motor driven by an energy storage device and a hydrogen fuel cell driven device. In another example, a powertrain can include separate or at-wheel motors driving each wheel of the vehicle. In such a vehicle, the methods described herein can be utilized to provide different torque commands to each of the wheels. In another exemplary embodiment, a powertrain can include selective all-wheel drive, traction control, horizontal stability control, or other systems that modulate power to the various wheels of the vehicle. Such systems and the modulation of power to the various wheels can be incorporated in the methods described herein through the determined desired corner force and moment distribution. Braking can similarly include a number of embodiments and selective activation of systems. For example, a vehicle can include regenerative braking at the wheels or can include typical brakes at the wheels and include selective engine braking, for example, capable of regenerating energy to an energy storage device through the engine braking. Selective braking on one side of a vehicle or increased braking on one side of a vehicle can aid in creating a desired corner force or moment distribution. Selective activation or modulation of the properties of anti-lock braking at different wheels can be used to create a desired corner force or moment distribution. Vehicle steering systems can take a number of embodiments, including front wheel steering, rear wheel steering, and four wheel steering according to methods known in the art. A number of different vehicle configurations and system combinations are envisioned, and the disclosure is not intended to be limited to the particular exemplary embodiments described herein.

The above embodiments of the vehicle control method primarily treat vehicle forces and moments as existing in a two-dimensional plane close to or coincident with the horizontal ground plane. However, it will be appreciated that a third dimension can be utilized in vehicle control methods. By addition of similar modules and constraints in a third-dimension, it will be appreciated that vehicle control methods can be described that include three dimensions of control including, for example, forward and rearward roll of the vehicle body in relation to the chassis of the vehicle and corresponding corner force and moments to maintain control over the vehicle. A roll control system is known to control dynamics of a vehicle body in relation to a vehicle chassis. Such control can be based upon information in either three dimensions or information in two dimensions and estimating an effect of that two dimensional data to roll.

The above methods describe utilizing a desired corner force and moment distribution to control a vehicle. Such methods can be accomplished by a number of different physical configurations or apparatuses. An exemplary apparatus to accomplish the above methods includes a command integration module determining an overall vehicle control command. The exemplary apparatus further includes a vehicle dynamics control module monitoring the overall vehicle control command and determining a desired vehicle force and moment based upon the overall vehicle control command. The exemplary apparatus further includes a corner dynamics control module monitoring the desired vehicle force and moment, monitoring real-time corner constraints, and determining a desired corner force and moment distribution based upon the desired vehicle force and moment and the real-time corner constraints. The apparatus further includes a vehicle system implementing vehicle control based upon the desired corner force and moment distribution.

Vehicle control methods based upon a desired force and moment acting upon the vehicle center of gravity of a vehicle may include open-loop table-lookup values, for example calibrated through intensive tuning for various driving conditions, or iterative calculations such as a least square method to achieve optimal performance, each individually controlling vehicle systems based upon the desired force and moment. However, these methods, including calibrated responses for the various vehicle systems to the desired force and moment input react based upon the behavior of that particular system or calibrated response. As a result, such responses include optimized minimum or maximum values for that given system that are local to that system. However, viewing the vehicle control response as a whole including all of the vehicle systems controlled, such local minimum or maximum values for a particular system or for a specific calibration can be different from an optimized vehicle-wide solution including responses based upon desired corner force and moment distribution. Further, iterative calculations for vehicle control can include a delay while the iterative calculations are resolved to a solution. Under dynamic or urgent driving conditions, such a delay can be undesirable for vehicle control methods. Instead, a closed-loop calculation can be preferable for vehicle control wherein a determinative answer can be solved for a given set of inputs.

The methods of the present disclosure include closed-loop calculations based upon finding an optimal closed form dynamics solution that helps to avoid iteration and reduces the need for intensive tuning of the controller. Vehicle longitudinal and lateral forces and yaw moment at the center of gravity can be determined based upon tire forces. These tire forces can be described as control parameters or the forces that can be controlled to achieve the desired vehicle dynamics. Ignoring self-aligning tire moments, vehicle dynamic equations describing longitudinal force upon the vehicle, $F_x$, lateral force upon the vehicle, $F_y$, and moment acting on a horizontal plane upon the vehicle, $G_z$, can be expressed as follows.

$$F_x = F_x(F_{x1}, F_{y1}, F_{x2}, F_{y2}, F_{x3}, F_{y3}, F_{x4}, F_{y4}) \quad [1]$$

$$F_y = F_y(F_{x1}, F_{y1}, F_{x2}, F_{y2}, F_{x3}, F_{y3}, F_{x4}, F_{y4}) \quad [2]$$

$$G_z = G_z(F_{x1}, F_{y1}, F_{x2}, F_{y2}, F_{x3}, F_{y3}, F_{x4}, F_{y4}) \quad [3]$$

Subscripts indicate the forces acting upon each of the individual tires. Equations 1-3 describing the forces acting at the vehicle's center of gravity as resultants of those applied from the road surface to the four tires can be expressed in the following linear form.

$$\begin{bmatrix} F_x \\ F_y \\ G_z \end{bmatrix} = A_F^{3\times 8} [F_{x1}, F_{y1}, F_{x2}, F_{y2}, F_{x3}, F_{y3}, F_{x4}, F_{y4}]^T \quad [4]$$

The term $A_F^{3\times 8}$ describes a matrix that depends upon the vehicle geometry and road wheel angles as follows:

$$A_F = \begin{bmatrix} \cos\delta_1 & -\sin\delta_1 & \cos\delta_2 & \\ \sin\delta_1 & \cos\delta_1 & \sin\delta_2 & \cdots \\ -\left(\frac{T}{2}\right)\cos\delta_1 + & a\cos\delta_1 + & \left(\frac{T}{2}\right)\cos\delta_2 + & \\ a\sin\delta_1 & \left(\frac{T}{2}\right)\sin\delta_1 & a\sin\delta_2 & \end{bmatrix}$$

$$\begin{matrix} -\sin\delta_2 & \cos\delta_3 & -\sin\delta_3 \\ \cos\delta_2 & \sin\delta_3 & \cos\delta_3 & \cdots \\ a\cos\delta_2 - & -\left(\frac{T}{2}\right)\cos\delta_3 - & -b\cos\delta_3 + \\ \left(\frac{T}{2}\right)\sin\delta_2 & b\sin\delta_3 & \left(\frac{T}{2}\right)\sin\delta_3 \end{matrix}$$

$$\begin{matrix} \cos\delta_4 & -\sin\delta_4 \\ \sin\delta_4 & \cos\delta_4 \\ \left(\frac{T}{2}\right)\cos\delta_4 - b\sin\delta_4 & -b\cos\delta_4 - \left(\frac{T}{2}\right)\sin\delta_4 \end{matrix} \Bigg] \quad [5]$$

The term T describes a track width or a width defined by the distance between the centerlines of tires on a left and right side of the vehicle at the ground level. The term $\delta_i$ describes the steer angle for each of the wheels. The terms a and b represent the distances between the center of gravity and the front and rear axles, respectively.

Equation 4 describes a method to determine a relationship between forces and moments acting upon the vehicle and acting upon each of the corners or wheels of the vehicle. However, it will be appreciated that as different assumptions are made about a vehicle, some of the terms of Equation 4 drop out. For example, based upon the active steering (active front steering, active rear steering, or both) present upon a vehicle, for a vehicle equipped with only active front steer and four wheel traction or braking, the available control parameters or the forces that can be controlled to achieve desired vehicle dynamics reduce to six, thereby allowing simplification of the closed form dynamics solution being determined. Equations 1-3, for such a vehicle, can be described by the following equations.

$$F_x = F_x(F_{x1}, F_{y1}, F_{x2}, F_{y2}, F_{x3}, F_{x4}) \quad [6]$$

$$F_y = F_y(F_{x1}, F_{y1}, F_{x2}, F_{y2}, F_{x3}, F_{x4}) \quad [7]$$

$$G_z = G_z(F_{x1}, F_{y1}, F_{x2}, F_{y2}, F_{x3}, F_{x4}) \quad [8]$$

General relationships of Equations 6-8 provide transition from the tire forces to the resultant forces applied to the vehicle center of gravity. According to the force summation linear principles, Equations 6-8 can be represented in the following matrix form.

$$\begin{bmatrix} F_x \\ F_y \\ G_z \end{bmatrix} = A_F^{3\times 6} [F_{x1}, F_{y1}, F_{x2}, F_{y2}, F_{x3}, F_{x4}]^T \quad [9]$$

In another example, for vehicles equipped with only active rear steer and four wheel traction or braking, the available control parameters reduce to six, which can be described by the following equations.

$$F_x = F_x(F_{x1}, F_{x2}, F_{x3}, F_{y3}, F_{x4}, F_{y4}) \quad [10]$$

$$F_y = F_y(F_{x1}, F_{x2}, F_{x3}, F_{y3}, F_{x4}, F_{y4})$$

$$G_z = G_z(F_{x1}, F_{x2}, F_{x3}, F_{y3}, F_{x4}, F_{y4}) \quad [12]$$

The corresponding matrix form of general Equations 10-12 can be described by the following equation.

$$\begin{bmatrix} F_x \\ F_y \\ G_z \end{bmatrix} = A_F^{3\times 6} [F_{x1}, F_{x2}, F_{x3}, F_{y3}, F_{x4}, F_{y4}]^T \quad [13]$$

Whereas Equation 9 includes the lateral tire forces on front wheels, Equation 13 includes the lateral tire forces on rear wheels.

Similarly, as some other control parameters are removed from the system, the vehicle dynamics equations reduce further. For example, for vehicles equipped with only four wheel traction or braking, the available control parameters reduce to four, ignoring self-aligning tire moments. For such a vehicle, the control parameters can be expressed as follows.

$$F_x = F_x(F_{x1}, F_{x2}, F_{x3}, F_{x4}) \quad [14]$$

$$F_y = F_y(F_{x1}, F_{x2}, F_{x3}, F_{x4}) \quad [15]$$

$$G_z = G_z(F_{x1}, F_{x2}, F_{x3}, F_{x4}) \quad [16]$$

The kinematic relations between the forces acting at the vehicle's center of gravity and those acting on the four tires can be described by the following equation.

$$\begin{bmatrix} F_x \\ F_y \\ G_z \end{bmatrix} = A_F^{3\times 4}[F_{x1}, F_{x2}, F_{x3}, F_{x4}]^T \quad [17]$$

The linear form of the vehicle dynamic equations with respect to the corner forces enables use of an exemplary standard optimization methodology as follows.

$$\begin{bmatrix} F_x^* - F_x(f+\delta f) \\ F_y^* - F_y(f+\delta f) \\ G_z^* - G_z(f+\delta f) \end{bmatrix} = \begin{bmatrix} F_x^* - F_x - \frac{dF_x}{df}\delta f \\ F_y^* - F_y - \frac{dF_y}{df}\delta f \\ G_z^* - G_z - \frac{dG_z}{df}\delta f \end{bmatrix} = \begin{bmatrix} F_x^* - F_x \\ F_y^* - F_y \\ G_z^* - G_z \end{bmatrix} - \begin{bmatrix} \frac{dF_x}{df} \\ \frac{dF_y}{df} \\ \frac{dG_z}{df} \end{bmatrix} \delta f \quad [18]$$

The terms f and δf describe vectors of tire forces and corner force control adjustments, respectively. The terms $F_x^*$, $F_y^*$ and $G_z^*$ describe target or desired longitudinal force, lateral force, and the rotational moment, respectively, determined by a driver command interpreter. Optimization of the vehicle dynamics can be accomplished by minimizing an error vector, E. The error vector is introduced in Equation 18 as follows.

$$E = \begin{bmatrix} F_x^* - F_x \\ F_y^* - F_y \\ G_z^* - G_z \end{bmatrix} \quad [19]$$

Similarly, a tire forces—center of gravity forces transition matrix, $A_F$, can be described as follows.

$$A_F = \begin{bmatrix} \frac{dF_x}{df} \\ \frac{dF_y}{df} \\ \frac{dG_z}{df} \end{bmatrix} \quad [20]$$

Equation 18 therefore yields the following equation.

$$\begin{bmatrix} F_x^* - F_x(f+\delta f) \\ F_y^* - F_y(f+\delta f) \\ G_z^* - G_z(f+\delta f) \end{bmatrix} = E - A_F \delta f \quad [21]$$

The terms $(E - A_F \delta f)$ can collectively be described as a closed loop tracking error. The term δf is the tire force variation to be determined. The following expression describes a friction ellipse physical constraint on tire force distribution due to tire characteristics.

$$\left[\left(\frac{F_{xi} + \delta F_{xi}}{F_{xi,max}}\right)^2 + \left(\frac{F_{yi} + \delta F_{yi}}{F_{yi,max}}\right)^2\right] \le 1 \quad [22]$$

$F_{xi,max}$ and $F_{yi,max}$ describe maximum forces that can be exerted by the tires in longitudinal and lateral directions, respectively, and can be described as follows.

$$F_{xi,max} = \mu_x F_{zi} \quad [23]$$

$$F_{yi,max} = \mu_y F_{zi} \quad [24]$$

Equation 21 and 22 together can be utilized to optimize corner force distribution by minimizing the following cost function.

$$P = \frac{1}{2}(E - A_F \cdot \delta f)^T W_E (E - A_F \cdot \delta f) + \frac{1}{2}\delta f^T W_{df} \delta f + \frac{1}{2}(f + \delta f)^T W_f (f + \delta f) \quad [25]$$

Of the components of Equation 25, the following expression describes a center of gravity force error component or error expression to be minimized or a minimized center of gravity force error component.

$$\frac{1}{2}(E - A_F \cdot \delta f)^T W_E (E - A_F \cdot \delta f) \quad [26]$$

Of the components of Equation 25, the following expression describes a constraint on tire force control variation or control energy component to be minimized or a minimized control energy component as follows.

$$\frac{1}{2}\delta f^T W_{df} \delta f \quad [27]$$

Of the components of Equation 25, the following expression describes a fast growing tire force near the friction ellipse of any tire or an expression describing tire force reserve component to be maximized or a maximized tire force reserve component.

$$\frac{1}{2}(f + \delta f)^T W_f (f + \delta f) \quad [28]$$

In order to minimize the number of parameters, all the weighting matrixes can be represented in the diagonal form, as follows:

$$\rho_{0i}^2 \left[\left(\frac{F_{xi}}{F_{xi,max}}\right)^2 + \left(\frac{F_{yi}}{F_{yi,max}}\right)^2\right] \quad [29]$$

$$W_f = \text{diag}[w(\rho_{01}^2), w(\rho_{01}^2), \ldots, w(\rho_{04}^2), w(\rho_{04}^2)] \quad [30]$$

$$W_E = \text{diag}[W_{Fx}, W_{Fy}, W_{Gz}][31]$$

$$W_{df} = \text{diag}[W_{\delta Fx1}, W_{\delta Fy1}, \ldots, W_{\delta Fx4}, W_{\delta Fy4}][=]$$

It is essential that Equation 29 includes no tire force control variations as compared to Equation 22. As a result, the cost function from Equation 25 has the quadratic form with respect to tire force control adjustments. Using Equation 25 and assuming as a necessary condition for finding a minimum that $$\frac{dP}{d\delta f} = 0,$$

a closed form solution for determining optimized tire force distribution or a real-time closed form dynamics optimization solution is obtained in the form as follows.

$$\delta f = [W_f + W_{df} + (A_F^T W_E) A_F]^{-1} [A_F^T (W_E E) - W_f f] \det[W_f + W_{df} + (A_F^T W_E) A_F] \neq 0 [33]$$

In this way, a system including exemplary corner dynamics control module 220 can generate the exemplary desired corner force and moment distribution 232 signal described above, which can subsequently be used in vehicle control, as described above.

The above methods describe methods of vehicle control that can be used to control vehicle systems. Vehicle systems can take many embodiments. For example, a powertrain is depicted in FIG. 1 including an engine and an electric motor. A number of different embodiments of a powertrain can be utilized. For example, a powertrain can include a single torque generative device, for example, including a motor or engine or two torque generative devices, such as two motors or a motor driven by an energy storage device and a hydrogen fuel cell driven device. In another example, a powertrain can include separate or at-wheel motors driving each wheel of the vehicle. In such a vehicle, the methods described herein can be utilized to provide different torque commands to each of the wheels. In another exemplary embodiment, a powertrain can include selective all-wheel drive, traction control, horizontal stability control, or other systems that modulate power to the various wheels of the vehicle. Such systems and the modulation of power to the various wheels can be incorporated in the methods described herein through the determined desired corner force and moment distribution. Braking can similarly include a number of embodiments and selective activation of systems. For example, a vehicle can include regenerative braking at the wheels or can include typical brakes at the wheels and include selective engine braking, for example, capable of regenerating energy to an energy storage device through the engine braking. Selective braking on one side of a vehicle or increased braking on one side of a vehicle can aid in creating a desired corner force or moment distribution. Selective activation or modulation of the properties of anti-lock braking at different wheels can be used to create a desired corner force or moment distribution. Vehicle steering systems can take a number of embodiments, including front wheel steering, rear wheel steering, and four wheel steering according to methods known in the art. A number of different vehicle configurations and system combinations are envisioned, and the disclosure is not intended to be limited to the particular exemplary embodiments described herein.

The above embodiments of the vehicle control method primarily treat vehicle forces and moments as existing in a two-dimensional plane close to or coincident with the horizontal ground plane. However, it will be appreciated that a third dimension can be important to vehicle control methods. By addition of other terms to the above equations, it will be appreciated that vehicle control methods can be described that include three dimensions of control including, for example, forward and rearward roll of the vehicle body in relation to the chassis of the vehicle and corresponding corner force and moments to maintain control over the vehicle.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a vehicle having a plurality of wheels, comprising:
    monitoring desired vehicle dynamics;
    determining a desired corner force and moment distribution based upon the desired vehicle dynamics and a real-time closed form dynamics optimization solution; and
    controlling the vehicle based upon the desired corner force and moment distribution;
    wherein the real-time closed form dynamics optimization solution is based upon:
        a minimized center of gravity force error component;
        a minimized control energy component; and
        a maximized tire force reserve component.

2. The method of claim 1, wherein determining the desired corner force and moment distribution based upon the real-time closed form dynamics optimization solution comprises:
    defining a cost function as the sum of the minimized center of gravity force error component, the minimized control energy component, and the maximized tire force reserve component;
    minimizing the cost function, assuming a derivative of the cost function with respect to a corner force variation equal to zero, to solve for the corner force variation; and
    utilizing the corner force variation to determine the desired corner force and moment distribution.

3. The method of claim 1, wherein the real-time closed form dynamics optimization solution is further based upon those wheels of the vehicle having active steering.

4. The method of claim 1, wherein the real-time closed form dynamics optimization solution is further based upon those wheels of the vehicle having braking.

5. The method of claim 1, wherein the real-time closed form dynamics optimization solution is further based upon those wheels of the vehicle having traction.

6. The method of claim 1, further comprising monitoring corner-based real-time constraints; and
wherein determining the desired corner force and moment distribution is further based upon the corner-based real-time constraints.

7. The method of claim 6, wherein the corner-based real-time constraints comprise corner states of health and corner capacities.

8. The method of claim 1, wherein controlling the vehicle based upon the desired corner force and moment distribution comprises generating commands to each of a plurality of vehicle systems based upon the desired corner force and moment distribution.

9. The method of claim 8, wherein generating commands to each of the plurality of vehicle systems comprises sending commands to a braking system.

10. The method of claim 8, wherein generating commands to each of the plurality of vehicle systems comprises sending commands to a steering system.

11. The method of claim 8, wherein generating commands to each of the plurality of vehicle systems comprises sending commands to a suspension system.

12. The method of claim 8, wherein generating commands to each of the plurality of vehicle systems comprises sending commands to a powertrain comprising a torque generative device.

13. The method of claim 8, wherein generating commands to each of the plurality of vehicle systems is further based upon real-time actuator-based constraints.

14. The method of claim 13, wherein the real-time actuator based constraints comprise energy capacity constraints and actuator limit constraints.

15. Method to control a vehicle, comprising:
monitoring desired vehicle dynamics;
determining a desired corner force and moment distribution based upon the desired vehicle dynamics and a real-time closed form dynamics optimization solution; and
controlling a braking system, a suspension system, and a steering system based upon the desired corner force and moment distribution;
wherein the real-time closed form dynamics optimization solution is based upon:
minimizing a center of gravity force error component;
minimizing a control energy component; and
maximizing a tire force reserve component.

16. Apparatus to control a vehicle, comprising:
a corner force distribution module:
monitoring desired vehicle dynamics;
determining a desired corner force and moment distribution based upon the desired vehicle dynamics and a real-time closed form dynamics optimization solution; and
controlling the vehicle based upon the desired corner force and moment distribution;
wherein the real-time closed form dynamics optimization solution is based upon:
a minimized center of gravity force error component;
a minimized control energy component; and
a maximized tire force reserve component.

17. The apparatus of claim 16, wherein the corner force distribution module comprises:
a vehicle dynamics module
monitoring the desired vehicle dynamics; and
determining a desired vehicle force and moment; and
a corner dynamics control module:
monitoring the desired vehicle force and moment; and
determining the desired corner force and moment distribution.

* * * * *